United States Patent [19]

Blaise et al.

[11] 4,025,709
[45] May 24, 1977

[54] PROCESS FOR THE POLYMERIZATION OF VINYLIDENE FLUORIDE

[75] Inventors: Jean Blaise, Oullins; Edouard Grimaud, Saint-Genis-Laval, both of France

[73] Assignee: Produits Chimiques Ugine Kuhlmann, Paris, France

[22] Filed: Sept. 22, 1975

[21] Appl. No.: 615,206

[30] Foreign Application Priority Data

Sept. 24, 1974 France .............................. 74.32093

[52] U.S. Cl. .............................. 526/225; 526/249; 526/254; 526/255
[51] Int. Cl.² ......................................... C08F 14/22
[58] Field of Search ........ 260/92.1, 87.5 B, 87.5 A, 260/85.5 D; 526/255, 254, 249, 225

[56] References Cited

UNITED STATES PATENTS

| | | | |
|---|---|---|---|
| 3,475,396 | 10/1969 | McCain et al. | 260/92.1 |
| 3,600,369 | 8/1971 | Toyoda et al. | 260/92.1 |
| 3,616,371 | 10/1971 | Ukihashi et al. | 260/92.1 |
| 3,640,985 | 2/1972 | Stevens | 260/92.1 |
| 3,780,007 | 12/1973 | Stallings | 260/92.1 |
| 3,781,265 | 12/1973 | Dohany | 260/92.1 |
| 3,798,265 | 3/1974 | Bartlett | 260/92.1 |
| 3,803,108 | 4/1974 | Ocone | 260/92.1 |
| 3,857,827 | 12/1974 | Dahany | 260/92.1 |

Primary Examiner—Harry Wong, Jr.
Attorney, Agent, or Firm—Pennie & Edmonds

[57] ABSTRACT

A process for the polymerization of vinylidene fluoride $H_2C=CF_2$ using a novel class of fluorinated emulsifiers having the general formula:

$$R_f-C_2H_4-SO_3M$$

wherein $R_f$ is a perfluorinated radical having 4 to 10 carbon atoms and M is an alkali metal such as lithium, sodium or potassium or an ammonium radical $NH_4$.

6 Claims, No Drawings

PROCESS FOR THE POLYMERIZATION OF VINYLIDENE FLUORIDE

BACKGROUND OF THE INVENTION

It is well known that the emulsion polymerization of fluorinated olefins in the presence of ordinary emulsifiers is very often inhibited or gives at best polymers without interest, as is the case for example with polymers produced with ionic or nonionic surfactants having short hydrocarbon chains substituted on to aromatic rings. Polymers made with such emulsifying agents have in particular a poor thermal stability.

During recent years various perhalogenated emulsifiers have been proposed for the polymerization fluorinated olefins and in particular the salts of chlorofluorinated or perfluorinated carboxylic acids, of omega-hydrogenated, perfluorinated carboxylic acids, of perfluorinated sulfonic acids, of chlorendic or hexachloro-endo-methylene tetrahydrophthalic acids, or of perchlorobenzene mono- or di-carboxylic acids. (U.S. Pat. Nos. 3,245,971 and 3,475,396 for example.)

However, in the case of vinylidene fluoride polymerization the salts of perhalogenated carboxylic acids, which decompose on heating, form colored degradation products and unsightly blisters and also lose strength and other desirable physical properties and lead to polymers of poor thermal stability, at least according to the tests set forth herein. The salts of perfluorinated sulfonic acids which would be satisfactory from that standpoint, are not available on the market in industrial quantities since the delicate method required for their manufacture has made them very costly.

SUMMARY OF THE INVENTION

The present invention relates to a process for the polymerization of vinylidene fluoride using a novel class of the water soluble salts of the general formula

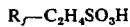

wherein $R_f$ is a perfluorinated radical having 4 to 10 carbon atoms. The water soluble salts can be formed using any metal of the first group of the Mendeleev Periodic Table (alkali- metal salts) such as lithium, sodium or potassium or an ammonium radical $NH_4$.

It has been discovered surprisingly that this series of emulsifiers available commercially and produced according to French Patent 1,600,425 issued Aug. 21, 1968 to Ugine Kuhlman, having the generic formula $R_fC_2H_4SO_3M$ with four hydrogen atoms per molecule, and in which M is an alkali metal salt or ammonium, are effective in obtaining by emulsion polymerization stable latexes of poly(vinylidene fluoride) of molecular weight which can be controlled at will and having excellent thermal stability. This finding is surprising since hydrogenated emulsifiers having a formula which permits considering them as being good surfactants, such as sodium lauryl sulfate or the nonylphenoloxyethylene types inhibit the polymerization of vinylidene fluoride. Thus, the presence of the —$C_2H_4$— moiety would lead one to expect that these products would inhibit polymerization or at least would retard it to such a degree that their use would not be possible. Experience has demonstrated that this is not at all the case.

The polymerization or copolymerization of vinylidene fluoride in the presence of fluorinated emulsifiers according to this invention is initiated by agents producing free radicals such as the per salts, persulfates of sodium or potassium, the redox systems persulfate/ferrous sulfate or persulfate/bisulfite, the organic peroxides such as ethylhexyl peroxydicarbonate.

The amounts of the initiator that could be used can vary such as disclosed in U.S. Pat. No. 2,435,537 so long as a sufficient amount of initiator is used to perform its intended function. In the case where alkali metal persulfates are employed as initiators, as in the examples which follow herein, it is necessary to use only a small proportion less than about 0.5% by weight based on the monomer in order to maintain a good thermal stability of polymer. The minimum amount would again be a sufficient amount to effect initiation, preferably in excess of 0.005%.

It can also be useful to add a buffer system to control pH, based for example on sodium pyrophosphate, sodium acetate or sodium borate. It is likewise useful to improve the latex quality by adding a mineral oil or a liquid paraffin at the polymerization temperature.

Among various conventional variations which can be made in the method of this invention, is the replacement of homopolymer by a copolymer obtained by adding a small quantity up to about 10% by weight based on the vinylidene fluoride of a comonomer known to be copolymerizable under the conditions of vinylidene fluoride polymerization. Suitable comonomers include ethylene, hexabluoropropene, tetrafluoroethylene, trifluorochloroethylene and ethylenically unsaturated compounds having 2 and 3 carbon atoms in which the hydrogen is at least partially substituted by chlorine or fluorine.

In the examples given below to illustrate this invention in a non-limiting manner, the same general mode of operation has been used throughout while changing the nature of the emulsifier used, in order to emphasize the importance of choosing this agent. The invention is also applicable to other known methods for the emulsion polymerization of vinylidene fluoride.

Into an autoclave of 3 liter capacity having an operating pressure of 100 bars, there are introduced 2 liters of deionized water, 0.11 grams of potassium persulfate 2.4 grams of emulsifier, 0.11 grams sodium acetate and 20 grams of paraffin melting at 54°–56° C. The temperature is adjusted between 80° C and 85° C. The reactants are deoxygenated by evacuation and vinylidene fluoride is admitted till the pressure reaches 90 bars. The agitation is started and as soon as polymerization takes place, the pressure decreases. Whenever the pressure reaches 85 bars, additional vinylidene fluoride is charged to bring the pressure back to 90 bars; this is done 40 successive times. Thus a latex is obtained having a concentration of polymer (i.e., a "solids content") equal to 35% by weight. The polymer is isolated from the latex by flocculation with sodium chloride in conventional manner and recovered by centrifugation or by simply drying in an oven.

Such a polymer cannot be molded except by compression, but in order to obtain a polymer moldable by injection or by extrusion, the molecular weight of the polymer can be lowered by following usual procedure of addition at the beginning of the polymerization one or more chain-transfer agents. In practice any such agent having a labile hydrogen or halogen atom can suffice, but the most efficient are found to be ketones and esters having 3 to 8 carbon atoms as well as halogen compounds, chlorides or bromides.

To evaluate the quality of the polyvinylidene fluorides obtained, the thermal stability was determined in three different ways.

Test A — The polymer is submitted to four molding cycles at 260° C. with intermediate grinding between the cycles in such manner as to return the material into a powdered form suitable for remolding.

Test B — Test samples of molded polymer are placed in boiling water for a period of 1 week.

Test C — Samples of molded polymer are heated for 1 hour in an oven with air circulating at 250° C.

EXAMPLES 1, 2 and 3

In a first series of three trials, polymers are made according to the above-described procedure using as emulsifier respectively 0.6, 1.2 and 2.4 grams of the sodium salt of perfluorooctanoic acid; and 1.1 kg. of polymer is isolated in each trial. The polymer is molded into plaques of 3mm. thickness.

In test A, the slabs become progressively more grey in proportion to the quantity of sodium perfluorooctanoate used in the polymerization.

In test B, the slabs become more and more brown until they attained a maroon color whose depth was in proportion to the quantity of sodium perfluorooctanoate used in the polymerization.

In test C, the slabs likewise become brown. The samples of the third trial also have some blisters, caused by the decomposition of the fluorinated carboxylic emulsifier.

EXAMPLE 4

The same procedure is used except that the emulsifier used is 2.4 grams of an emulsifier having the formula $C_8F_{17}C_2H_4SO_3Na$. Again, 1.1 kg of polymer is isolated, and small slabs of 3 mm thickness are molded. In test A, practically no change is observed. In test B there is no observable difference in the appearance of aged and non-aged samples. In test C, no change in color is observed, nor any formation of blister.

EXAMPLE 5

The same procedure is used except that the emulsifier used is 2.4 grams of an emulsifier having the formula $C_6F_{13}C_2H_4SO_3Na$. 1.1 kg of polymer is isolated, and small slabs of 3 mm thickness are molded.

The results obtained in the tests are identical with those observed with the polymer of example 4.

EXAMPLES 6 and 7

The same procedure is used except that the emulsifier used is 2.4 grams of respectively $C_6F_{13}C_2H_4SO_3Na$ and $C_8H_{17}C_2H_4SO_3Na$; and with the exception that in both these examples, while the reactor is at 80°–85° C. and has been deoxygenated, hexafluoropropene is admitted up to a pressure of 6 bars before then admitting vinylidene fluoride. The admission of vinylidene fluoride is then continued, as previously, until a pressure of 90 bars is reached, and the operation is continued as in the earlier examples, obtaining in each case a 35% solids latex of a copolymer containing 3% of $C_3F_6$. The copolymers are isolated as previously. These copolymers are then molded into slabs of 3 mm. thickness.

In test A, practically no change is observed. In test B, there is no observable difference in the appearance of aged and non-aged samples. In test C, no change in color is observed.

EXAMPLE 8

The same procedure is used as in Examples 1, 2 and 3 except that in place of the carboxylic emulsifier there is used 2.4 grams of an emulsifier having the formula $C_6F_{15}$-$C_2H_4$-$SO_3K$. 1.1 kg of polymer is isolated, and small slabs of 3 mm. thickness are molded.

In test A, only a very small darkening of color is observed. In test B, there is no observable difference in the appearance of aged and non-aged samples. In test C, no change in color is observed.

EXAMPLE 9

The same procedure is followed as in the preceding example except that the emulsifier used is 2.4 grams of a composition of formula $C_6F_{15}C_2H_4SO_3NH_4$. 1.1 kg of polymer is isolated and small slabs of 3 mm. thickness are molded.

In test A a small darkening in color is observed. In test B there is distinguished with difficulty a difference in the appearance of the aged and non-aged samples. In test C a very small change in color is observed.

EXAMPLE 10

The same procedure is followed except that the emulsifier is of formula $C_6F_{15}C_2H_4SO_3Li$. Again 2.4 grams of emulsifier are used. 1.1 kg of polymer is isolated and small slabs of 3 mm. thickness are molded.

In test A only a very small change is observed. In test B there is no observable difference in appearance between aged and non-aged samples. In test C a very small change in color is noted.

We claim:

1. Process for the homopolymerization of vinylidene fluoride or the copolymerization of vinylidene fluoride with less than about 10% by weight based on the vinylidene fluoride of an ethylenically unsaturated comonomer known to be copolymerizable therewith, which comprises polymerizing the vinylidene fluoride alone or together with said comonomer in an aqueous medium in the presence of a peroxide initiator and between about 0.2% and 0.5% based on the weight of the water of a water-soluble salt of a compound corresponding to the formula $$R_f\text{—}C_2H_4SO_3H$$

in which $R_f$ is a perfluoroalkyl radical containing from 4 to 10 carbon atoms.

2. Process according to claim 1 in which the water-soluble salt is a metal salt selected from the group I metals of the Mendeleev Periodic Table Of Elements or an ammonium salt.

3. Process according to claim 2 in which the water-soluble salt is a sodium salt.

4. Process according claim 1 in which the amount of peroxide initiator is between about 0.005% and 0.5% by weight based on the weight of the monomer.

5. Process according to claim 1 in which the comonomer is ethylene, hexafluoropropene, tetrafluoroethylene, trifluorochloroethylene or ethylenically unsaturated compounds having 2 and 3 carbon atoms in which the hydrogen is at least partially substituted by chlorine or fluorine.

6. Process according to claim 1 in which the emulsifying agent is a water-soluble salt of $CF_3(CF_2)_5$-$C_2H_4$-$SO_3H$ or of $CF_3(CF_2)_7C_2H_4SO_3H$.

* * * * *

UNITED STATES PATENT AND TRADEMARK OFFICE
CERTIFICATE OF CORRECTION

PATENT NO. : 4,025,709
DATED : May 24, 1977
INVENTOR(S) : Jean Blaise and Edouard Grimaud It is certified that error appears in the above-identified patent and that said Letters Patent are hereby corrected as shown below:

Column 1, lines 15 and 16, "polymerization fluorinated olefins should read --polymerization of fluorinated olefins- Column 2, line 28, "hexabluoropropene" should read
--hexafluoropropene--

Signed and Sealed this

Twenty-seventh Day of September 197

[SEAL]

Attest:

RUTH C. MASON
Attesting Officer

LUTRELLE F. PARKER
Acting Commissioner of Patents and Trademark